(12) United States Patent
Eckelberry et al.

(10) Patent No.: US 6,471,227 B2
(45) Date of Patent: Oct. 29, 2002

(54) METHOD FOR SECURING SLIDER TO TRAILER

(75) Inventors: James Eckelberry, Canton, OH (US); Frank A. Maly, Jr., Beverly Hills, MI (US); Steven R. Miller, Clarkston, MI (US); John K. Ma, Rochester, MI (US); Joseph Melekian, Rochester Hills, MI (US); Nancy L. Saxon, Oakland Township, MI (US); Rajesh J. Somnay, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/812,380

(22) Filed: Mar. 20, 2001

(65) Prior Publication Data

US 2002/0135153 A1 Sep. 26, 2002

(51) Int. Cl.[7] .............................................. B62D 53/06
(52) U.S. Cl. .................................. 280/149.2; 280/407.1
(58) Field of Search ........................... 280/149.2, 407.1

(56) References Cited

U.S. PATENT DOCUMENTS

| | | | | |
|---|---|---|---|---|
| 3,087,741 A | * | 4/1963 | De Lay | 280/149.2 |
| 3,372,946 A | * | 3/1968 | Hutchens | |
| 5,564,727 A | * | 10/1996 | Wessels | |
| 5,642,896 A | * | 7/1997 | Pierce et al. | |
| 5,676,389 A | * | 10/1997 | Richardson | |

FOREIGN PATENT DOCUMENTS

DE          35 40 338      *  8/1986

OTHER PUBLICATIONS

Photograph depicting dog-toothed locking mechanism for trailer fifth wheel Admitted prior art, date unknown.

* cited by examiner

Primary Examiner—Paul N. Dickson
Assistant Examiner—Ruth Ilan
(74) Attorney, Agent, or Firm—Carlson, Gaskey & Olds

(57) ABSTRACT

A number of improved ways of connecting a slider to a trailer frame are disclosed. In one general type of solution, a wedge-shaped locking surface is formed on both the slider and the trailer. The wedged surfaces provide a very secure connection. In another general way of describing the embodiments, several of the embodiments have a plurality of locking surfaces which again provide a more secure connection.

7 Claims, 2 Drawing Sheets

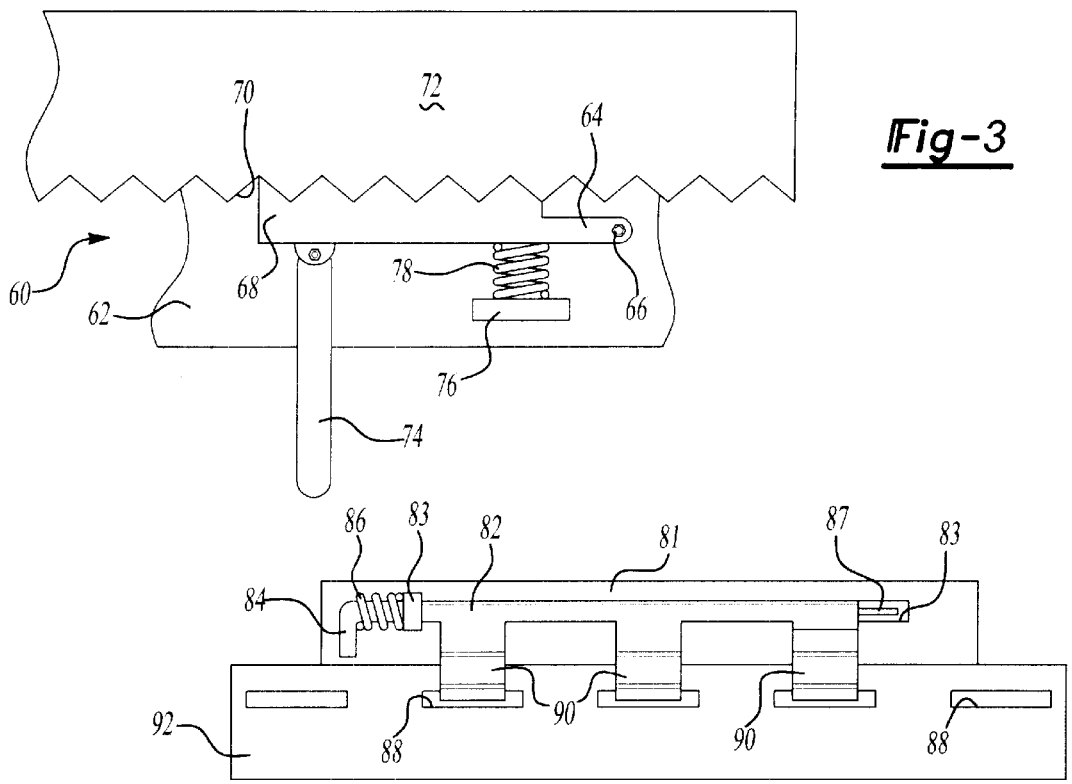
Fig-3
Fig-4A
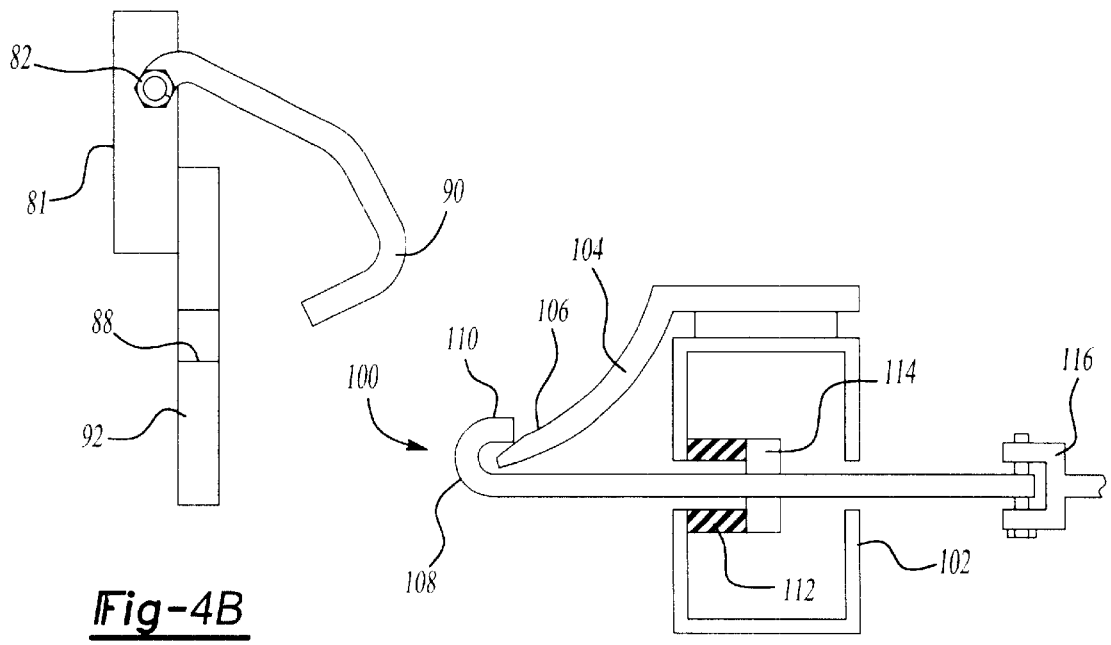
Fig-4B
Fig-5

METHOD FOR SECURING SLIDER TO TRAILER

BACKGROUND OF THE INVENTION

This invention relates to improved methods of securing a trailer slider to a trailer at any of a number of incrementally adjusted positions. The embodiments generally disclose wedged interfitting members, and/or a plurality of connections on each side of the frame of the trailer and the slider.

Trailers as utilized in modem vehicles are typically supported by a slider or bogey. The slider carries the wheels, suspensions, brakes, etc. Due to varying load and handling conditions, the location of the slider is desirably moved relative to the trailer. Thus, the two are typically provided with a plurality of selectable mount locations.

Generally, some system is actuated to withdraw positioning pins from interfitting holes in a trailer frame and in a slider frame. With the pins at the withdrawn location, the slider can be adjusted relative to the trailer. Once the slider is at a new desired location the pins are actuated to move back through a new set of matched holes, again securing the slider on the trailer, but at a new position.

While the prior art has been successful, it would be desirable to provide improved connection, and reduce the complexity and number of steps required for adjusting the slider relative to the trailer.

SUMMARY OF THE INVENTION

In a series of disclosed embodiments, two main features could be said to be common. In one main feature, there is a wedged shape complimentary interlocking surface between the trailer and the slider. This provides a very secure connection. Another main feature of connection disclosed in this application is the use of a plurality of interlocking surfaces on each lateral side of the trailer and slider. Again, the use of the plurality of connections provides a very secure locking function. Some of the embodiments include both features, and others include one or the other.

In one embodiment, dog-toothed locking members are driven into wedge shaped openings on the trailer frame. The dog-toothed locking members are driven into a locking position to securely lock the slider relative to the trailer.

In another embodiment, a toothed lever carries a plurality of teeth on each lateral side of the trailer and slider. The lever is biased to a locking position where it engages a plurality of teeth on the trailer. The lever is movable to a retracted position at which the slider can move relative to the trailer to a new position. At the new position the lever is again driven to its locking position with a plurality of teeth interlocking to secure the slider relative to the trailer.

In another embodiment, a rotating locking member carries a plurality of teeth which are selectively moved into slots on one of the trailer or slider. This mechanism is somewhat similar to the adjustable seat track mechanisms, and provides a secure and easily adjustable connection.

In yet another embodiment, a clip member is driven against an angled surface on the frame of the trailer to provide a wedged and secure connection. The clip member is preferably spring biased to its locked position, and movable to its unlocked position.

These and other features of the present invention can be best understood from the following specification and drawings, the following of which is a brief description.

BRIEF DESCRIPTION OF THE DRAWINGS

FIG. 3 shows a second embodiment.

FIG. 4A shows a third embodiment.

FIG. 4B shows the FIG. 4A embodiment in a retracted position.

FIG. 5 shows a fourth embodiment.

DETAILED DESCRIPTION OF A PREFERRED EMBODIMENT

Figure 1A:
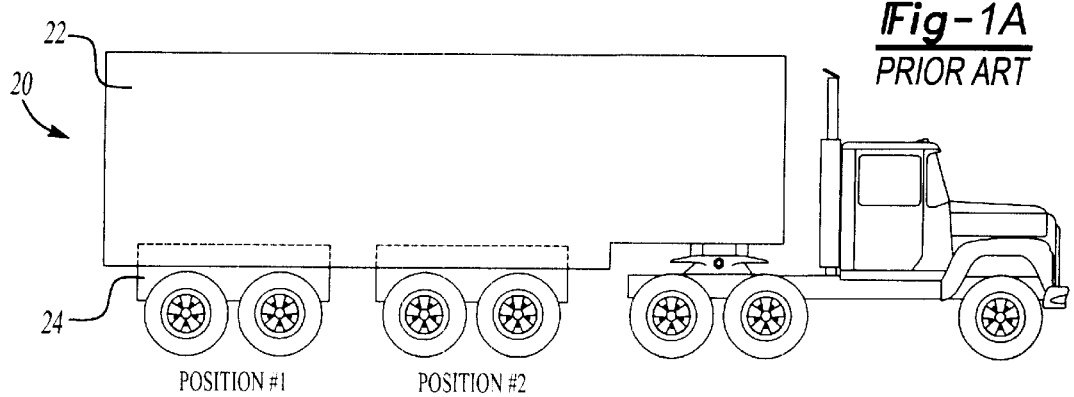
FIG. 1A schematically shows a prior art system.

FIG. 1A shows a prior art trailer and slider combination 20. The trailer 22 rides on the slider 24, which carries the wheels, suspension, brakes, etc. The slider is typically movable between several positions (Position 1, Position 2, etc.) as desired.

Figure 1B:
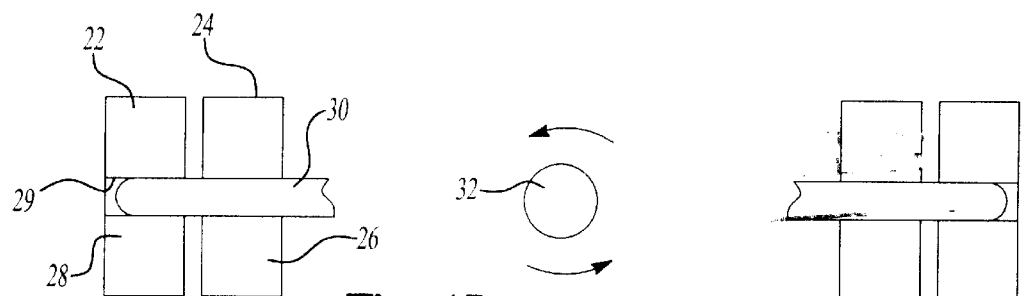
FIG. 1B shows the locking mechanism of the prior art.

As can be seen in FIG. 1B, the trailer 22 typically includes a frame rail 28 having holes 29. The slider 24 has its own rail 26, and carries positioning pins 30. A mechanism 32 is actuated to retract the pins 30 from the openings 29. In a retracted position the slider can roll relative to the trailer and allow adjustment of the position of the slider.

The above described prior art has proven successful, however, it would be desirable to provide a more secure and easier operating connection.

Figure 2:
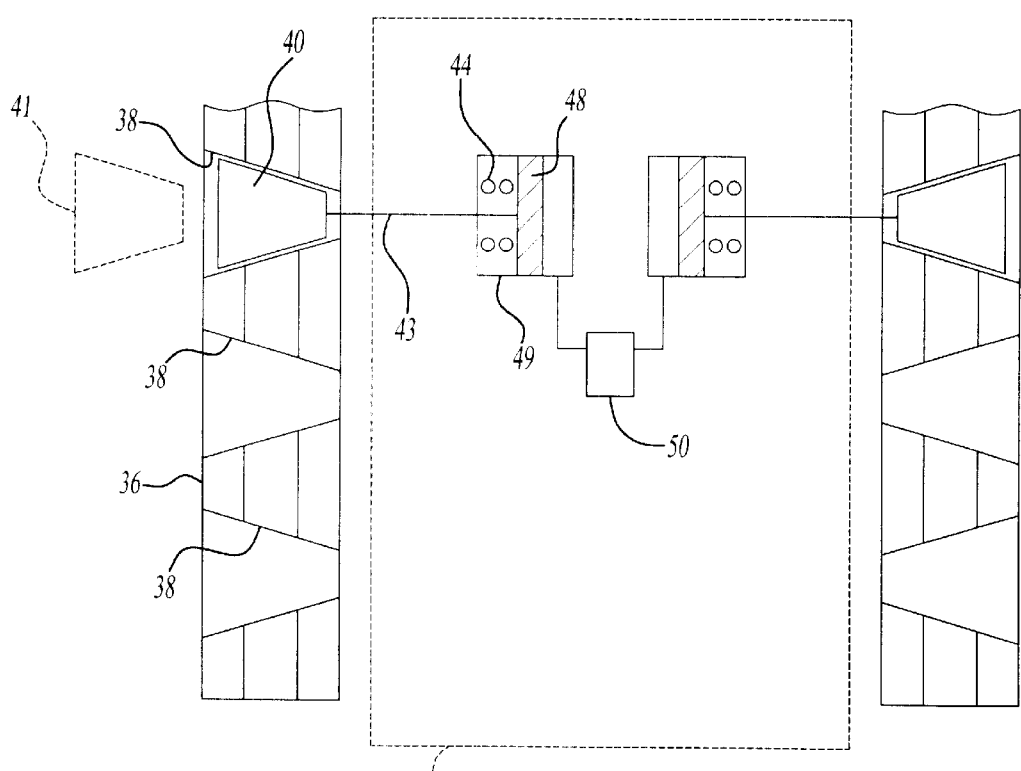
FIG. 2 schematically shows a first embodiment of this invention.

FIG. 2 shows an embodiment 34 wherein the slider 35 is positioned between frame rails 36 on the trailer. The frame rails 36 are provided with a plurality of wedged shaped openings 38 at an exposed face. The slider 35 carries a number of dog-toothed clutch members 40 which are typically spring biased inwardly and into the frame rail 36. Thus, the dog-toothed clutch members 40 are typically in the engaged position shown. A piston 48 is included in a cylinder 49, and a control 50 drives the piston outwardly to an unlocked position such that the clutch 40 is driven by a connecting rod 43 to the position such as is shown in phantom at 41. When the control 50 releases the mechanism from this unlocked position the spring 44 drives the dog-toothed member 40 back to its locked position. The wedged connection between the opening 38 and the dog-toothed clutch 40 provides a very secure and very reliable connection.

The wedged connection provides a holding force in both the direction of travel of the trailer, but also in a direction perpendicular to the direction of travel.

Moreover, the FIG. 2 embodiment has its holding force directed inwardly, with the clutch members 40 being driven in a lateral inward direction. This embodiment thus provides a very secure holding force.

FIG. 3 shows another embodiment 60 wherein the slider 62 carries a lever 64 pivotally connected at 66. A plurality of teeth 68 are formed on the lever 64. The teeth 68 interfit with a plurality of teeth 70 on the trailer rail 72. A handle 74 allows an operator to pivot the lever 64 about point 66 and in opposition to a spring force 78. The spring 78 is mounted on a portion 76 of the frame of the slider 62. Now, the handle 74 may be actuated to move the lever 64 from the illustrated position to a position at which teeth 68 are not received in teeth 70. The slider 62 may then be adjusted. As is known, there is a similar mechanism on each lateral side of the trailer, and it may be that a single actuation handle 74 is utilized to actuate both levers 64. Moreover, an automatic control such as is shown in FIG. 2 may be utilized to drive both levers 64.

As with the prior embodiment there is a wedge-shaped interaction now between the slider and the trailer. Further, there are a plurality of locking locations again increasing the security of the connection.

FIGS. 4A and 4B show yet another embodiment 80 wherein the slider frame 81 carries a locking mechanism 82 having an actuation handle 84. A spring 86 biases the locking mechanism 82 to its locked position, by causing the locking member 82 to be driven to rotate in a particular location about an axis 87. Member 83 is marked on frame 81 for rotation such as by bearings 83. A plurality of slots 88 are formed in a trailer frame 92, and a plurality of teeth 90 extend into the slots 88 in the locked position. When it is desired to move the slider relative to the trailer, the handle 84 is actuated against the force of spring 86 and the fingers 90 move outwardly of the slots 88 as shown in FIG. 4B. The slider position may then be adjusted and the spring 86 is allowed to drive the fingers 90 back to the locked positions in the slots 88. Again, the use of the plurality of locking surfaces increases the security of the mount.

FIG. 5 shows another embodiment 100 wherein the slider member 102 is secured to a trailer frame 104 at an angled location 106 that provides a wedging lock. A clip 108 includes an inner hook portion 110 driven by a resilient spring sleeve 112 against a plate 114 movable with the clip 108. A mechanism 116 is operable to move the clip 108 laterally to the left as shown in FIG. 5, or outwardly of the lateral side of the trailer 104. In the extended released position, the slider 102 can move relative to the trailer 104. The mechanism 116 is then returned to its retracted position and the spring 112 forces the hook 110 against the angle 106 providing a wedged connection. Structurally, the FIG. 5 system looks somewhat similar to safety clips which are utilized to hold a slider on a trailer today. However, the known safety clips are not biased into engagement with the trailer, and do not serve to hold the slider on the trailer, but rather to ensure the trailer will not slide off of the slider should the prior art positioning pins fail or not be actuated.

The embodiments generally include surfaces wherein the holding surface is wedged shaped. Stated another way, the interacting surfaces change in surface area.

Several embodiments of this invention have been disclosed, however, a worker in this art would recognize that modifications would come within the scope of this invention. For that reason the following claims should be studied to determine the true scope and content of this invention. For that reason the following claims should be studied to determine the true scope and content of this invention.

What is claimed is:

1. A slider for being secured to a trailer comprising:
   a slider frame positioned on each lateral side of a slider body; and
   a mechanism for securing said slider body to a trailer frame, said mechanism including a locking member which is driven in a first direction by said mechanism such that a locking member engagement surface engages a complementary frame surface on said trailer frame, and said engagement surface being in contact with said frame surface, over a contact area which increases in a direction opposite to said first direction.

2. A slider as recited in claim 1, wherein said locking member includes a toothed clutch member having a wedged-shape which is to be driven into a wedged opening in said frame.

3. A slider as set forth in claim 2, wherein said locking member is single locking member which is spring driven to a locked position but fluid driven to an open position at which it will extend beyond a lateral extent of said trailer frame.

4. A slider for being secured to a trailer comprising:
   a slider frame positioned on each lateral side of a slider body;
   a mechanism for securing said slider body to a trailer frame, said mechanism including a locking member which is driven in a first direction by said mechanism such that a locking member surface engages a frame surface on said trailer frame, and said locking member surface interacting with said frame surface with an engagement surface which increase in the direction to which said locking member is driven;
   said locking member includes a toothed clutch member having a wedged-shape which is to be driven into a wedged opening in said frame; and
   said toothed clutch member includes a plurality of teeth, and said slider mechanism carrying said plurality of teeth on a pivoting lever.

5. A slider as set forth in claim 1, wherein there are a plurality of said locking member surfaces.

6. A slider for being secured to a trailer comprising:
   a slider frame positioned on each of two lateral sides of a slider body;
   a mechanism for securing said slider body to a trailer frame, said mechanism including a plurality of surfaces complementary to a plurality of surfaces on each said lateral side of said trailer frame; and
   said plurality of surfaces are wedge-shaped teeth which are pivoted to a locking position at which they will be engaged in teeth in said trailer, when said slider is mounted on said trailer.

7. A trailer and slider combination comprising:
   a trailer having frame rails on each of two opposed lateral sides;
   a slider including frame surfaces associated with each of said lateral sides of said trailer;
   said frame surfaces on said trailer having a plurality of incrementally spaced locking locations, and said slider having a locking mechanism for locking said slider into selected ones of said incrementally spaced locking locations, said locking mechanism on said slider including a surface which is wedge-shaped and complimentary to a wedged surface on said trailer, said wedge-shaped surface being in contact with said wedged surface on said trailer.

* * * * *